(12) United States Patent  
Chen et al.

(10) Patent No.: US 8,713,491 B2
(45) Date of Patent: Apr. 29, 2014

(54) PRE-COLORED METHODOLOGY OF MULTIPLE PATTERNING

(75) Inventors: Yen-Huei Chen, Jhudong Township (TW); Hung-Jen Liao, Hsinchu (TW); Jonathan Tsung-Yung Chang, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 13/607,946

(22) Filed: Sep. 10, 2012

(65) Prior Publication Data

US 2013/0263066 A1 Oct. 3, 2013

Related U.S. Application Data

(60) Provisional application No. 61/617,105, filed on Mar. 29, 2012.

(51) Int. Cl.
*G06F 17/50* (2006.01)

(52) U.S. Cl.
USPC ............................................. 716/55; 716/50

(58) Field of Classification Search
USPC ........................................... 716/50, 55
See application file for complete search history.

(56) References Cited

U.S. PATENT DOCUMENTS

| 5,266,939 | A | * | 11/1993 | Shibasaki et al. | 345/471 |
| 8,484,607 | B1 | * | 7/2013 | Tang et al. | 716/136 |
| 2008/0244503 | A1 | * | 10/2008 | Graur et al. | 716/19 |
| 2010/0199253 | A1 | * | 8/2010 | Cheng et al. | 716/13 |
| 2013/0061185 | A1 | * | 3/2013 | Abou Ghaida et al. | 716/55 |

* cited by examiner

*Primary Examiner* — Vuthe Siek
(74) *Attorney, Agent, or Firm* — Eschweiler & Associates, LLC (57) ABSTRACT

Some embodiments relate to a method of pre-coloring word lines and control lines within an SRAM integrated chip design to avoid timing delays that result from processing variations introduced through multiple patterning lithography processes. The method is performed by generating a graphical IC layout file having an SRAM circuit with a plurality of word lines and Y-control lines. The word lines and Y-control lines are assigned a color during decomposition. The word lines and Y-control lines are further pre-colored in a manner that deliberately assigns the pre-colored data to a same mask. Therefore, during mask building, data associated with pre-colored word and Y-control lines is sent to a same mask, regardless of the colors that are assigned to the data. By assigning word and Y-control lines to a same mask through pre-coloring, processing variations between the word and Y-control lines are minimized, thereby mitigating timing variations in an SRAM circuit.

19 Claims, 6 Drawing Sheets

PRE-COLORED METHODOLOGY OF MULTIPLE PATTERNING

REFERENCE TO RELATED APPLICATIONS

This application is a Non-Provisional application claiming priority to U.S. Provisional Application Ser. No. 61/617,105 filed Mar. 29, 2012 in the name of Yen-Huei Chen, et al. entitled "Pre-Colored Methodology of Multiple Patterning" and is herein incorporated.

BACKGROUND

Over the last four decades the semiconductor industry has improved the performance and power consumption of integrated chips (ICs) by reducing the size of components within the ICs. For example, by reducing the size of transistors within an IC, semiconductor manufacturers are able to build ICs having more transistors that operate at faster speeds and lower power.

In large part, the ability to shrink the size of components within an IC is driven by lithographic resolution. In recent years however, tool vendors have been unable to adequately decrease the wavelength of illumination sources, so that developing technology nodes have minimum feature sizes of 20% or less than the wavelength of illumination used in lithographic tools.

Multi patterning lithography (MPL) is one lithography strategy that is used in emerging technology nodes to overcome limitations in lithographic resolution. During MPL data prep, an original layout is decomposed into two or more colors (e.g., black and gray), such that features of a same color are formed on a same mask of a multiple patterning lithography exposure (e.g., a double patterning, triple patterning, etc.). By splitting IC layout data into multiple masks, printing below a printable threshold is enabled since the data on each of the separate masks does not violate the printable threshold.

DETAILED DESCRIPTION

The present disclosure will now be described with reference to the drawings wherein like reference numerals are used to refer to like elements throughout, and wherein the illustrated structures are not necessarily drawn to scale. It will be appreciated that this detailed description and the corresponding figures do not limit the scope of the present disclosure in any way, and that the detailed description and figures merely provide a few examples to illustrate some ways in which the inventive concepts can manifest themselves.

Figure 1A:
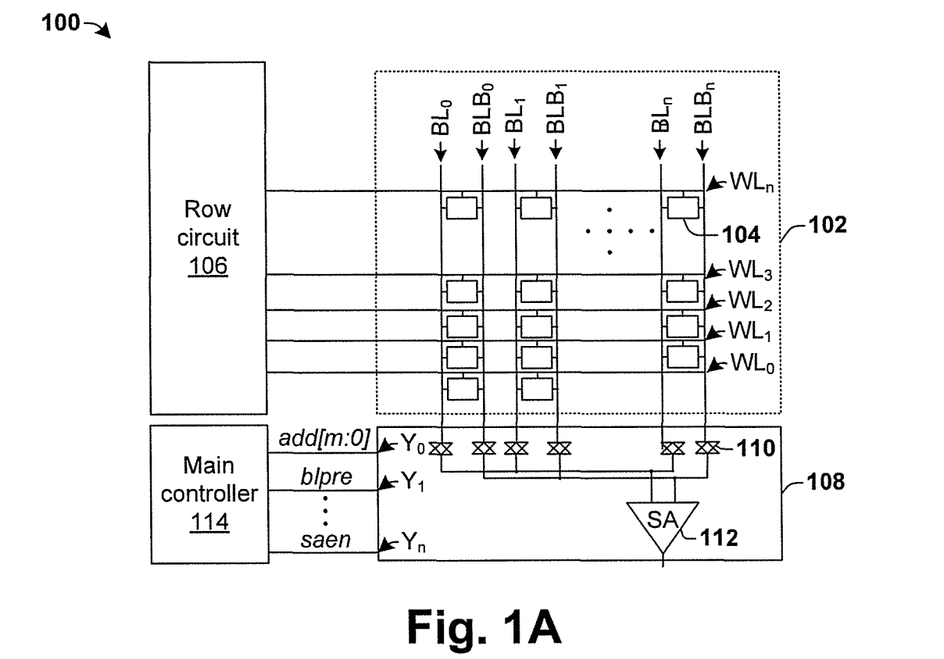
FIG. 1A is a block diagram of an exemplary SRAM circuit.

FIG. 1A is a block diagram of an exemplary static random access memory (SRAM) circuit 100. The SRAM circuit 100 comprises an SRAM memory array 102 having a plurality of SRAM cells 104 configured to store data. The SRAM cells 104 are connected to periphery circuits, such as a row circuit 106 and a column circuit 108, by way of a plurality of parallel word lines $WL_0$-$WL_n$ and parallel bit lines $BL_0$-$BLB_n$.

During operation, a main controller 114 is configured to provide control signals to the row circuit 106 and to the column circuit 108. For example, control lines $Y_0$-$Y_n$ provide control signals (e.g., add[m:0], blpre, saen, etc.) to one or more components of the column circuit 108 (e.g., such as multiplexers 110 and one or more sense amplifiers 112). Based upon the control signals, the row circuit 106 is configured to activate one of the plurality of word lines $WL_0$-$WL_n$, while the column circuit 108 is configured to activate a bit line and a complimentary bit line (e.g., $BL_0$ and $BLB_0$) from the plurality of bit lines $BL_o$-$BLB_n$. The activated word line and bit line combination defines a cell address, which upon being accessed provides a charge to the sense amplifier 112.

In many emerging technology nodes, IC layers having small minimum dimensions are decomposed to form a multiple mask set for performing a multiple patterning lithography (MPL). Decomposition of an IC layout is performed according to an algorithm that assigns different colors (corresponding to different mask exposures) to adjacent shapes separated by a space less than a printable threshold and that randomly assigns colors adjacent shapes separated by a space greater than or equal to the printable threshold. Shapes assigned a same color are then written to a same mask of a multiple patterning lithography exposure (e.g., a double patterning, triple patterning, quadruple patterning, etc.) so as to enable printing below the printable threshold.

Figure 1B:
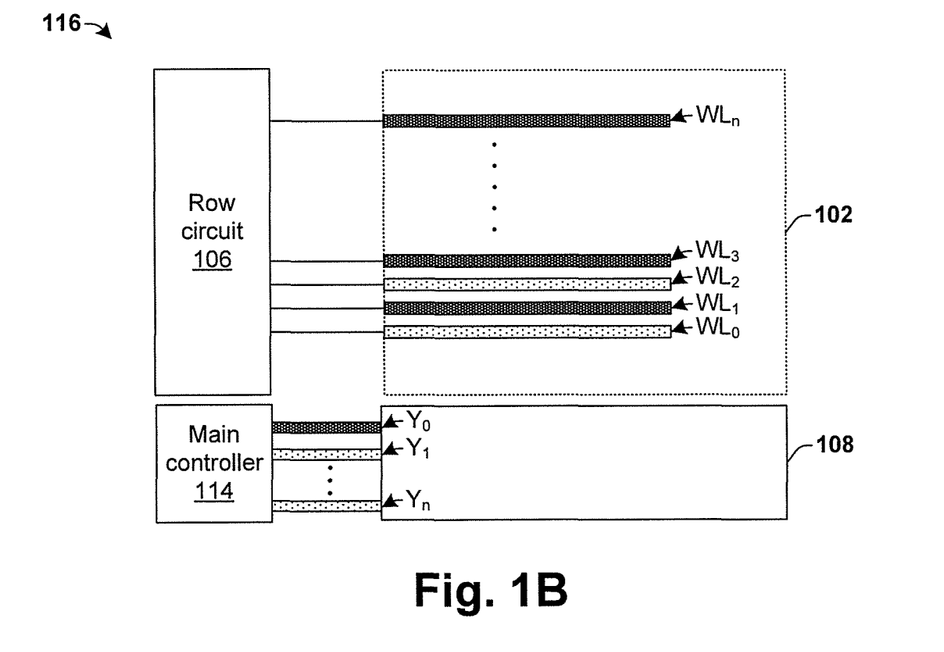
FIG. 1B illustrates an exemplary decomposition of word lines and control lines within the SRAM circuit of FIG. 1A to form a two mask set for a double patterning lithography process.

FIG. 1B is a block diagram 116 showing an exemplary decomposition of word lines (e.g., $W_{L0}$-$W_{Ln}$) and control lines (e.g., $Y_0$-$Y_n$) of SRAM circuit 100 to form a two mask set for a double patterning lithography (DPL) process. Each of the word lines $W_{L0}$-$W_{Ln}$ and control lines $Y_0$-$Y_n$ has been assigned a color (e.g., during a decomposition of the IC layout) that indicates a mask with which the line is associated. For example, word lines $W_{L1}$, $W_{L3}$, and $WL_n$ and control line $Y_0$ have been assigned a first color (corresponding to a first mask), while word lines $WL_0$ and $WL_2$ and control lines $Y_1$ and $Y_n$ have been assigned a different, second color (corresponding to a second mask).

While the use of double patterning lithography allows for a lithographic exposure tool to reduce the minimum feature size that it can print, the decomposition of word lines and control lines onto different masks may introduce processing variations between the on-chip word lines and control lines, such as for example overlay shift (i.e., misalignment of photolithography masks used in a multiple exposure process) or line width variation (i.e., CD variation). While such processing variations had a minimal effect on performance in larger technology nodes (e.g., 45 nm), it has been appreciated that as the size of integrated chip components shrink (e.g., in emerging technology nodes such as 22 nm, 16 nm, etc.), such processing variations can lead to word line timing that is unable to track control signals and that therefore causes functional failure of the SRAM circuit 100.

Figure 2:
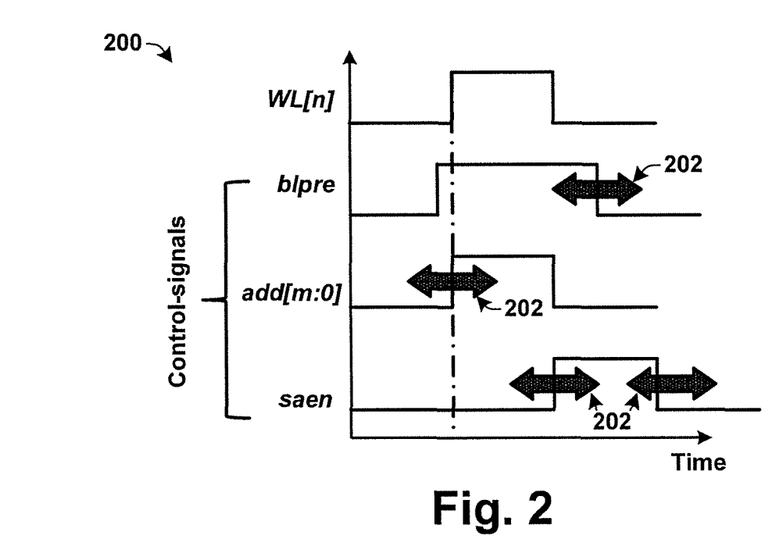
FIG. 2 illustrates exemplary timing diagrams showing signals provided to a word line and to one or more control lines.

For example, FIG. 2 is a timing diagram 200 showing a word-line pulse WL[n] provided to a word line and one or more control signals provided to Y-control lines. For an SRAM circuit to function properly, the word-line pulse WL[n] should be synchronized with the control signals (e.g., add[m:0], blpre, saen). However, processing variations (i.e., mask misalignment, CD variation) between the word lines and control lines may introduce a timing variation 202 that makes word-line pulses WL[n] unable to synchronize with the control signals (e.g., add[m:0], blpre, saen). For example, if the bit line pre-charge signal blpre leads the back edge of the word line pulse WL[n], a "crow-bar" current may occur and cause function failure of an SRAM circuit.

Accordingly, the present disclosure relates to a method of pre-coloring word lines and control lines within an SRAM integrated chip layout to avoid timing delays that result from processing variations introduced through multiple patterning lithography processes. In some embodiments, the method comprises generating a graphical IC layout file comprising an SRAM circuit having a plurality of word lines and control lines. A decomposition algorithm is operated to assign colors to uncolored word lines and control lines within the graphical IC layout file. The word lines and control lines are also pre-colored in a manner that denotes lines that are to be written to a same mask. During mask building, data associated with word lines and control lines that have been pre-colored is automatically written to a same mask (i.e., word lines and control lines are not assigned to different masks based upon color, but are instead assigned to a same mask based upon the pre-coloring). By assigning word lines and control lines to a same mask through pre-coloring, processing variations between the word and control lines are minimized, thereby mitigating timing variations in an SRAM circuit.

Figure 3:
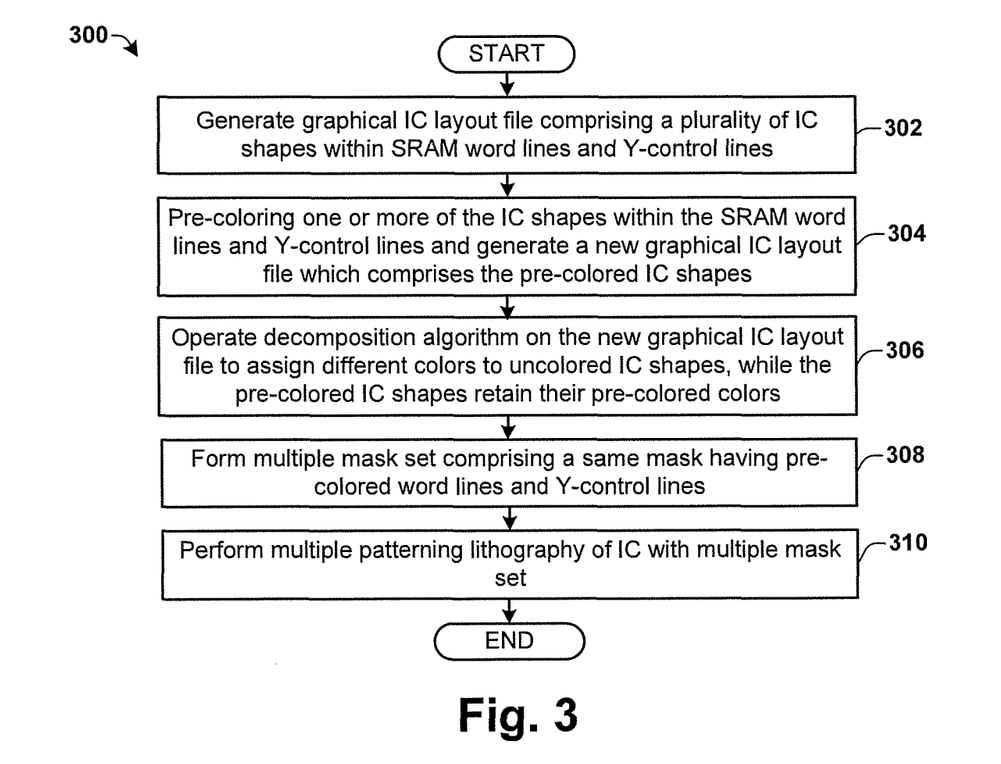
FIG. 3 is a flow diagram illustrating some embodiments of a method for pre-coloring word lines and control lines of a SRAM circuit in a multiple patterning lithography process.

FIG. 3 is a flow diagram illustrating a method 300 of pre-coloring word lines and control lines of a SRAM circuit for use in a multiple patterning lithography process.

At step 302, a graphical integrated chip (IC) layout file is generated comprising a plurality of IC shapes comprised within word lines and Y-control lines of a static random access memory (SRAM) cell. The graphical IC layout file is a graphical representation of an SRAM circuit comprising word lines, and Y-control lines that are oriented parallel to the word lines. The word lines are configured to activate an SRAM cell, while the Y-control lines are configured to control operation of one or more components of a column circuit (e.g., a sense amplifier, bit line multiplexors, etc.). In some embodiments the Y-control lines are configured to convey control signals to the column circuit, such as for example a sense amplifier enable signal, Y-address decoding signals, read/write enable signals, BL pre-charge signals, etc. In some embodiments, the graphical IC layout comprises a Graphic Database System (GDS) file, such as a GDS or GDSII file. In other embodiments, the graphical layout may comprise a CIF or OASIS file format, for example.

At step 304, one or more of the plurality of IC shapes within the word lines and Y-control lines of the SRAM circuit are pre-colored and a new graphical IC layout file containing the pre-colored shapes is generated. Pre-coloring the word lines and Y-control lines denotes that the word lines and control lines are assigned to a same mask upon writing the IC layout data to a plurality of masks, independent of any color assigned to the word lines and/or control lines during decomposition.

It will be appreciated that in various embodiments, the word lines and Y-control lines may be pre-colored in various manners. In some embodiments, pre-coloring is performed by placing a pre-coloring marker shape on one or more of the plurality of word lines and Y-control lines to indicate that the marked IC word lines and Y-control lines are to be formed on a particular mask of a multiple mask set. The pre-coloring marker shape may be placed over colored or uncolored word lines and Y-control lines during design (i.e., by a designer) to indicate that the shape has been pre-colored, for example. In such embodiments, word lines and Y-control lines assigned a pre-colored marker shape are can be to a particular mask in spite of colors assigned during decomposition. In other embodiments, pre-coloring is performed by assigning a pre-coloring color not used in decomposition to the word lines and Y-control lines. In such an embodiment, the total number of colors is greater than the number of masks, such that data assigned the pre-coloring color and another color are to be formed on a particular mask of the multiple mask set. In yet other embodiments, pre-coloring is performed by assigning a color used in decomposition to word lines and Y-control lines prior to decomposition In some embodiments, the pre-coloring of word lines and control lines is governed by integrated chip design rules that prevent the formation of unprintable masks. For example, in some embodiments design rules may limit placement of pre-coloring marker shapes to prevent placement of pre-coloring marker shapes on adjacent word lines and/or control lines that are separated by a space less than a design rule value.

At step 306, a decomposition algorithm is operated on the new graphical IC layout file. The decomposition algorithm assigns different colors to uncolored word lines and Y-control lines within the new graphical IC layout file, while the pre-colored wordlines and the Y-control lines keep their pre-colored color. The decomposition algorithm thereby separates the word lines and Y-control lines into multiple groups, with each group assigned a different color. The different colored groups are associated with a different mask used in a multiple patterning lithography process. For example, lines having a first color (e.g., black) are associated with a first mask, while lines having a second color (e.g., gray) are associated with a second mask.

At step 308, a multiple mask set is formed in a manner that writes pre-colored word lines and Y-control lines to a same mask. In some embodiments, the multiple mask set is formed by writing pre-colored word lines and Y-control lines to a same mask, while word lines and Y-control lines that are not pre-colored are written to various masks based upon their assigned colors during decomposition. By forming word lines and Y-control lines on a same mask processing variations (e.g., overlay errors and/or CD variations) are reduced between the word lines and Y-control lines. By reducing the processing variations, timing variations between the word lines and Y-control lines are also reduced so as to improve synchronization between word line signals and Y-control line signals.

At step 310, a multiple exposure lithography of an integrated chip is performed using the multiple mask set. In some embodiments the multiple patterning lithography may comprise a double pattern, double etch (2P2E) process.

Figure 4:
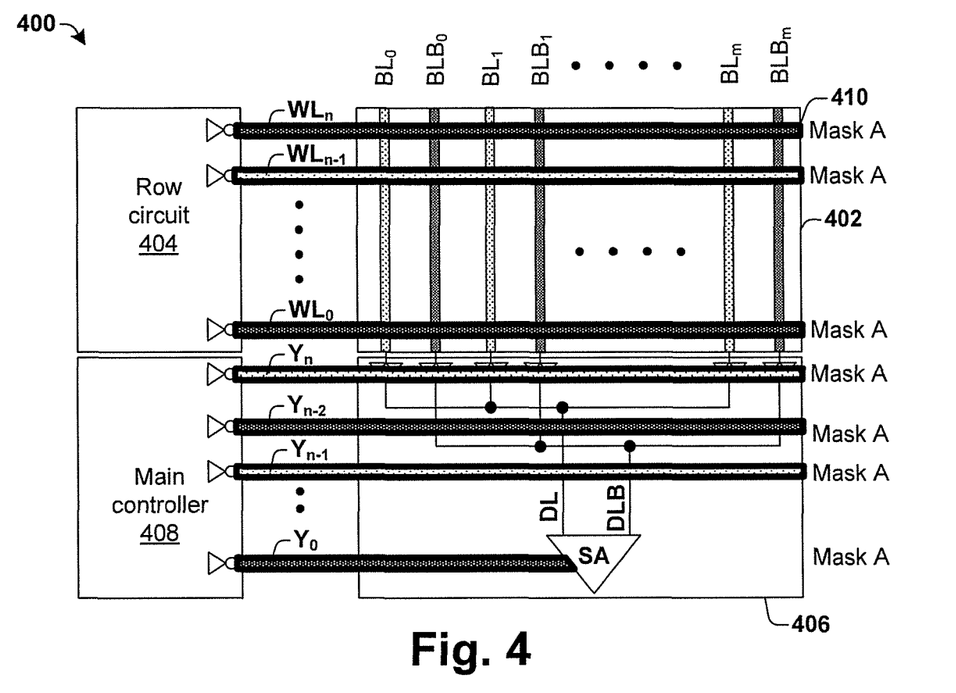
FIG. 4 illustrates a block diagram of some embodiments of an SRAM circuit having pre-colored word lines and control lines.

FIG. 4 illustrates an integrated chip layout of an SRAM circuit 400 having pre-colored word lines and Y-control lines.

The SRAM circuit 400 comprises an SRAM array 402 having a plurality of word lines $WL_0$-$WL_n$ and a plurality of bit lines $BL_0$-$BLB_m$. The SRAM circuit 400 further comprises a row circuit 404 and a column circuit 406. The row circuit 404 is configured to selectively activate word lines $WL_0$-$WL_n$. The column circuit 406 is configured to selectively activate the bit lines $BL_0$-$BLB_m$. A plurality of Y-control lines $Y_0$-$Y_n$ are oriented parallel to the word lines $WL_0$-$WL_n$ and are configured to convey control signals that control operation of the column circuit 406. In some embodiments, control signals carried by the Y-control lines may comprise sense amplifier enable signals, Y-address decoding signals, read/write enable signals, and bit line pre-charge signals, for example.

During operation, the SRAM circuit 400 activates SRAM memory cells within the SRAM array 402 by activating a combination of bit lines $BL_0$-$BLB_m$ and word lines $WL_0$-$WL_n$. The bit lines $BL_0$-$BLB_m$ are activated by the column circuit 406, based upon control signals received from a main controller 408 by way of the plurality of Y-control lines $Y_0$-$Y_n$. Because bit line activation is controlled by the column circuit 406, synchronization of the Y-control lines $Y_0$-$Y_n$ with the word lines $WL_0$-$WL_n$ also synchronizes operation of the bit lines $BL_o$-$BLB_m$ and word lines $WL_0$-$WL_n$ and ensures proper operation of the SRAM circuit 400.

As shown in SRAM circuit 400, the word lines $WL_0$-$WL_n$ and Y-control lines $Y_0$-$Y_n$ have been assigned different colors through decomposition. For example, words lines $WL_0$ and $WL_n$ and control lines $Y_0$ and $Y_{n-1}$ have been assigned a first color, while word line $WL_{n-1}$ and control lines $Y_{n-2}$ and $Y_n$ have been assigned a different, second color. The word lines $WL_0$-$WL_n$ and Y-control lines $Y_0$-$Y_n$ have also been pre-colored with marker shape 410.

Typically, IC structures associated with the first color are written to the first mask, while IC structures associated with the second color are written to a second mask. However, by pre-coloring the word lines $WL_0$-$WL_n$ and Y-control lines $Y_0$-$Y_n$, the lines are written onto a same mask during mask formation in spite of the colors that have been assigned to the lines during decomposition. By writing the word lines $WL_0$-$WL_n$ and Y-control lines $Y_0$-$Y_n$ onto the same mask, processing variations between the word lines and the control lines (e.g., overlay errors and/or CD tolerance) are reduced, thereby improving operation of the SRAM circuit 400.

Figure 5A:
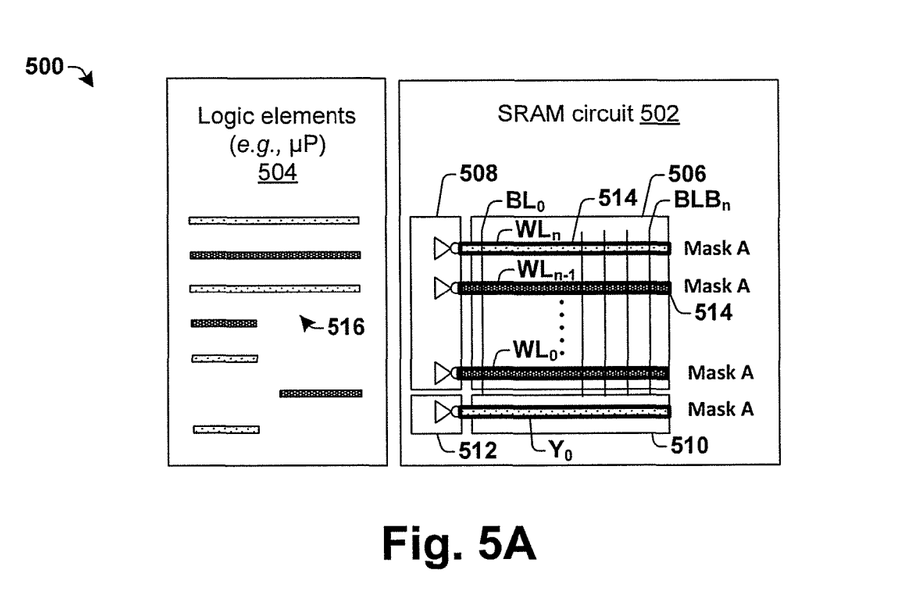
FIG. 5A illustrates a block diagram of some embodiments of an integrated circuit having an SRAM circuit with pre-colored word lines and control lines.

FIG. 5A illustrates a block diagram of an integrated chip 500. The integrated chip 500 comprises an SRAM circuit 502 and one or more logic elements 504 (e.g., a microprocessor). The SRAM circuit 502 comprises an SRAM array 506 having a plurality of SRAM cells (not shown) configured to store data. The SRAM array is connected to periphery circuits (e.g., row circuit 508, column circuit 510) by way of a plurality of word lines $WL_0$-$WL_n$ and bit lines $BL_0$-$BLB_n$ configured to control access to SRAM cells storing data. A main controller 512 is further configured to provide control signals to column circuit 510 by way of one or more control lines $Y_0$.

In SRAM circuit 502, pre-coloring has been selectively enabled within the SRAM circuit 502, without enabling pre-coloring within other sections of the IC layout, such as for example the logic elements 504. For example, the word lines $WL_0$-$WL_n$ and control line $Y_0$ are pre-colored by marker shape 514, while IC structures 516 within logic elements 504 are not pre-colored (e.g., have no pre-coloring marker shapes). By selectively enabling pre-coloring within the SRAM circuit 504, mask formation is governed by colors assigned during decomposition within areas of the integrated chip that are outside of the SRAM circuit 502, while mask formation is governed by a combination of pre-coloring and colors assigned during decomposition within the SRAM circuit 502.

Figure 5B:
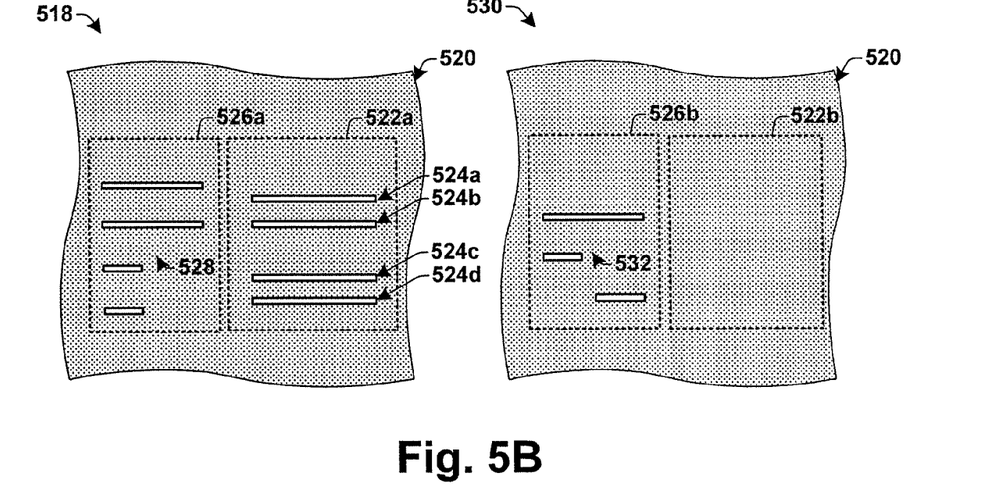
FIG. 5B illustrates a block diagram of some embodiments of a two mask set corresponding to the integrated circuit of FIG. 5A for use in a double patterning lithography process.

FIG. 5B illustrates a two mask set corresponding to the integrated chip layout 500 of FIG. 5A. The two mask set comprises a first mask 518 and a second mask 530. The first mask 518 has openings 528 within an opaque surface 520 that correspond to data having a first color in an area 526a, which corresponds to logic elements 504. The first mask 518 also has openings 524a-524d within the opaque surface 520 that correspond to pre-colored word lines or Y-control lines in an area 522a, which corresponds to SRAM circuit 502. The second mask 530 has openings 526 within an opaque surface 520 that correspond to data having a second color in an area 526b, which correspond to logic elements 504. However, the second mask 530 does not have any openings corresponding to word lines or Y-control lines in an area 522b, which corresponds to SRAM circuit 502. This is because the word lines and Y control lines have been pre-colored in area 522b to be on a same mask (i.e., the first mask 518).

Figure 6:
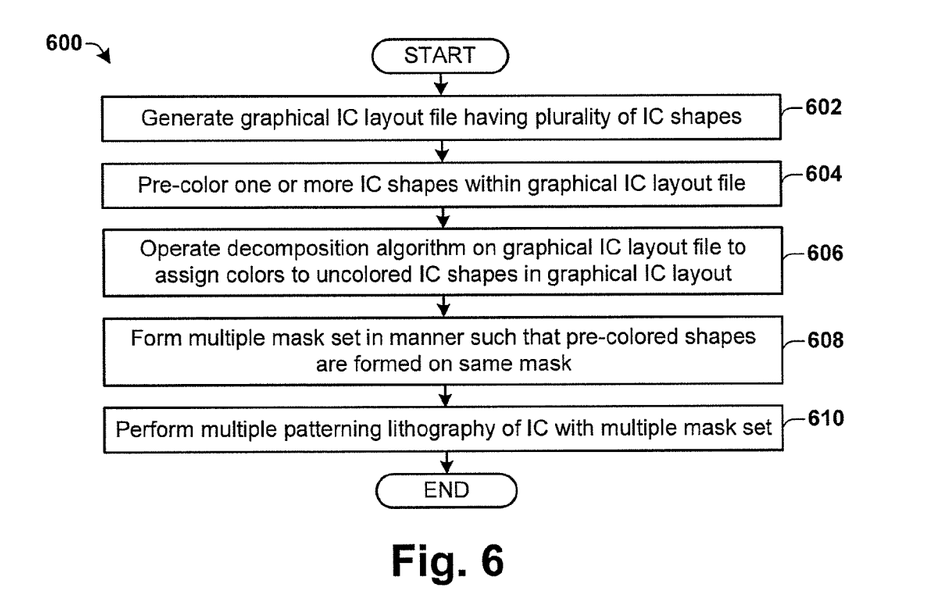
FIG. 6 is a flow diagram illustrating some embodiments of a method of pre-coloring data for use in a multiple patterning lithography process.
Figure 7:
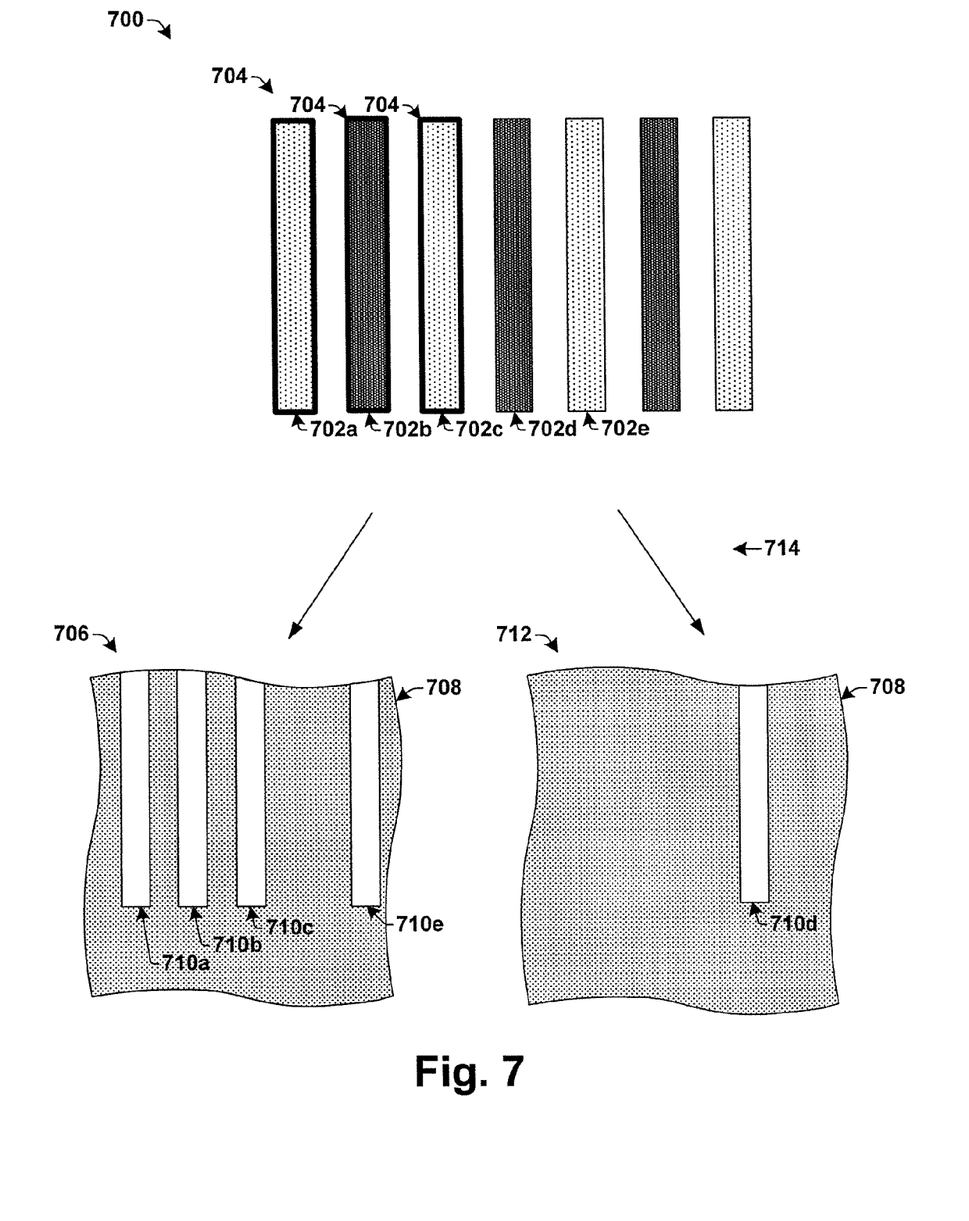
FIG. 7 is a block diagram illustrating some embodiments of an exemplary decomposition of an integrated chip layout with pre-colored data to form a two mask set for a double patterning lithography process.

Although the method of pre-coloring has been described above in relation to an SRAM circuit, it will be appreciated that the disclosed method is not limited to application within an SRAM circuit. Rather, the disclosed method of pre-coloring may be applied to any data within an integrated chip layout. FIGS. 6-7 illustrate some embodiments of the disclosed method of pre-coloring applied to IC shapes within an integrated chip layout.

FIG. 6 is a flow diagram illustrating some embodiments of a method 600 of pre-coloring data corresponding to one or more IC shapes for a multiple patterning lithographic exposure process (e.g., a double patterning exposure process, a triple patterning exposure process, etc.).

It will be appreciated that while the methods disclosed herein (e.g., methods 300 and 600) are illustrated and described as a series of acts or events, that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

Figure 8:
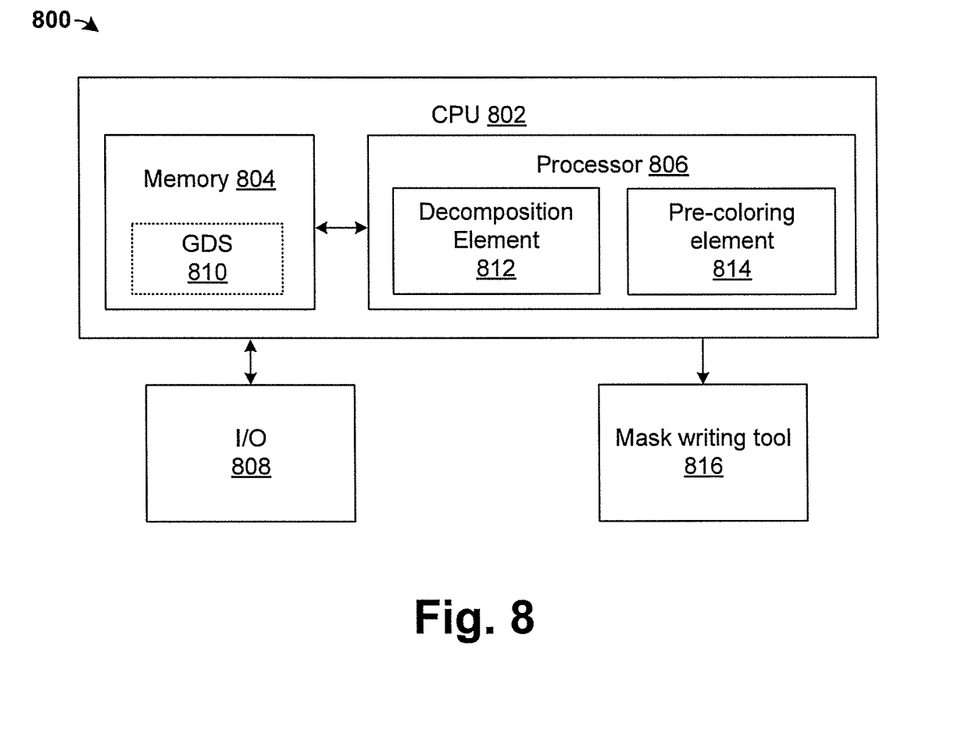
FIG. 8 illustrates some embodiments of an exemplary computing environment wherein one or more of the provisions set forth herein may be implemented.

Furthermore, the disclosed methods may be implemented as a apparatus, or article of manufacture using standard programming and/or engineering techniques to produce software, firmware, hardware, or any combination thereof to control a computer to implement the disclosed subject matter (e.g., the circuits shown in FIG. 8, are non-limiting examples of circuits that may be used to implement the disclosed methods). The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

At step 602, a graphical IC layout file comprising a plurality of IC shapes is generated. The graphical IC layout file contains a graphical representation of an integrated chip. In various embodiments, the graphical IC layout file may comprise a graphical layout file format such as a CIF format, a GDS format, etc. In some embodiments, the plurality of IC shapes may comprise an SRAM word line and/or Y-control lines. In other embodiments, the plurality of IC shapes may comprise other IC shapes (e.g., shapes outside of an SRAM cell).

At step 604, one or more of the plurality of IC shapes within the graphical IC layout file are pre-colored. Pre-colored IC shapes are assigned to a specific mask of a multiple mask set for a multiple patterning lithography process. In other words, pre-coloring the IC shapes is a means of identifying the IC shapes that are to be written to a specific mask during mask building independent of decomposition. In some embodiments, the IC shapes may be pre-colored by assigning a pre-coloring marker shape to the IC shapes. The pre-coloring marker shape may be placed over a colored IC shape to indicate that the shape has been pre-colored, for example.

At step 606, a decomposition algorithm is operated on the graphical IC layout file. The decomposition algorithm separates data within the graphical IC layout file into multiple groups, with each group assigned a different color. In some embodiments, the decomposition algorithm assigns two or more colors to uncolored IC shapes (i.e., IC shapes that have not been assigned a color). The different colored IC shapes are associated with different masks used in a multiple patterning lithography process. For example, IC shapes assigned a first color (e.g., black) are associated with a first mask, while IC shapes assigned a second color (e.g., gray) are associated with a second mask.

At step 608, a multiple mask set is formed in a manner that writes pre-colored data to a same mask. In some embodiments, the multiple mask set is formed by writing pre-colored IC shapes to a particular mask, while IC shapes that are not pre-colored are written to masks based upon their assigned colors. For example, in a double patterning lithography process a first mask is generated to form non-pre-colored IC shapes that have been assigned a first color and a second mask is generated to form both non-pre-colored IC shapes that have been assigned a second color and pre-colored IC shapes. In other words, when forming masks, the pre-colored data is written to a mask despite the color assigned to the data, while non-pre-colored data is written to a mask based upon a color assigned to the data.

At step 610, a multiple patterning lithography is performed using the multiple mask set. In some embodiments the multiple patterning lithography may comprise a double pattern, double etch (2P2E) process.

Although method 600 illustrates embodiments wherein pre-coloring (step 606) is performed after decomposition (step 604), one of ordinary skill in the art will appreciate that in other embodiments pre-coloring (step 606) may also be performed prior to decomposition (step 604).

Some embodiments of an exemplary integrated chip layout 700, whereon such a method 600 is implemented, is illustrated in FIG. 7. It will be appreciated that although FIG. 7 is described in relation to the formation of metal wire segments (i.e., metal interconnect lines), the disclosed method of pre-coloring data is not limited to such layers. Rather, the disclosed method of pre-coloring may be applied in any layers and/or areas of an integrated chip layout that utilizes a multiple patterning lithography process.

Integrated chip layout 700 comprises a plurality of metal wire segments 702*a*-702*e* that have been assigned a color (e.g., during a decomposition of the IC layout 700), which indicates a mask with which a metal wire segment is associated for a double patterning lithography process. For example, metal wire segments 702*a*, 702*c* and 702*e* have been assigned a first color, while metal wire segments 702*b* and 702*d* have been assigned a second color. Furthermore, a pre-colored marker shape 704 has been placed onto metal wire segments 702*a*, 702*b*, and 702*c*.

During mask formation 714 (e.g., corresponding to step 608) a two mask set is formed to enable a double patterning lithography process. The two mask set comprises a first mask 706 and a second mask 712. The first mask 706 comprises data that has been pre-colored, as well as data that was assigned the first color during decomposition. For example, pre-colored metal wire segment 702*a*, 702*b*, and 702*c* are written onto the first mask 706 as openings 710*a*, 710*b* and 710*c* within opaque surface 708 (e.g., a chrome surface) due to pre-coloring with marker shape 704. Furthermore, metal wire segment 702*e* is written onto the first mask 706 as opening 710*e* within opaque surface 708 due to it being assigned the first color.

The second mask 712 comprises data that has not been pre-colored and that was assigned the second color during decomposition. For example, metal wire segment 702*d* is written onto the second mask 712 due to it being assigned the second color. However, metal wire segment 702*b*, despite being assigned the second color, is not written onto the second mask 712 since it was pre-colored with marker shape 704.

It will be appreciated that the illustrated first and second masks non-limiting examples intended to aid the reader's understanding. Although the first and second masks, 706 and 712, are illustrated as chrome masks with simple geometric openings corresponding to the location of metal wire segments (e.g., 710*a*, 710*b*, . . . ), one or ordinary skill in the art will appreciate that actual masks may not resemble the metal wire segments but instead will contain printing enhancement features added during optical proximity correction. Furthermore, it will be appreciated that the disclosed method of pre-coloring may be applied to a multiple-patterning lithography scheme using more than two masks. For example, a triple patterning lithography scheme would decompose an integrated chip layout into a three mask set, a quadruple patterning lithography scheme would decompose an integrated chip layout into a four mask set, etc.

FIG. 8 illustrates an example of a system 800 comprising a computing device 802 (e.g., server) configured to implement one or more embodiments provided herein. In one configuration, computing device 802 includes at least one processing unit 806 and a memory 804. Components of computing device 1002 may be connected by various bus interconnects, such as a Peripheral Component Interconnect (PCI), a Universal Serial Bus (USB), firewire (IEEE 13104), an optical bus structure, etc.

Memory 804 is configured to contain a graphical IC layout file 810 (e.g., a GDS file) containing data corresponding to an IC layout. The processing unit 806 is configured to read the graphical IC layout file from memory 804. The processing unit 806 comprises a decomposition element 812 configured to perform decomposition on the graphical IC layout file 810 and a pre-coloring element 814 configured to pre-color data within the graphical IC layout file 810.

In some embodiments, the decomposition element 812 and/or the pre-coloring element 814 may comprise a software program executed by the processing unit 806. In one embodiment, computer readable instructions to implement the decomposition and/or pre-coloring may be stored in a memory (e.g., memory 804). In such embodiments, processing unit 806 may download a part or all of the computer readable instructions for execution during operation. In other embodiments, the decomposition element 812 and/or pre-coloring element 814 may comprise hardware configured to performed a decomposition and/or pre-coloring of data within the graphical IC layout file 810.

In some embodiments the pre-coloring element 814 may be operated by way of I/O 808 (e.g., a keyboard, mouse, etc.) to add one or more pre-coloring marker shapes to the graphical IC layout file 810. An output port of the computing device 802 is configured to output the data after pre-coloring and decomposition have been completed. The output data is provided to a mask writing element 816. In some embodiments, the mask writing element 816 may comprise an e-beam lithography tool or a laser mask writing tool, for example. The mask writing element 816 is configured to form one or more masks based upon the decomposed and pre-colored data output from the processing unit 806

Although the disclosure has been shown and described with respect to a certain aspect or various aspects, equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the disclosure. In addition, while a particular feature of the disclosure may have been disclosed with respect to only one of several aspects of the disclosure, such feature may be combined with one or more other features of the other aspects as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

Therefore, the present disclosure relates to method of pre-coloring word lines and parallel Y-control lines within an IC layout to reduce processing variations caused by a multiple patterning lithography process.

In some embodiments, the present disclosure relates to a method for pre-coloring IC layout data for a multiple patterning lithography process, comprising generating a graphical IC layout file comprising a plurality of IC shapes. The method further comprises pre-coloring selective IC shapes to indicate that the pre-colored IC shapes are to be formed on a same mask independent of the decomposition algorithm. The method further comprises operating a decomposition algorithm that assigns two or more different colors to uncolored IC shapes, such that IC shapes assigned a same color are to be formed on a same mask of a multiple mask set used for the multiple patterning lithography process. By forming the pre-colored IC shapes on the same mask processing variations between on-chip structures corresponding to the pre-colored IC shapes are reduced.

In another embodiment, the present disclosure relates to a method for generating a multiple mask set for a multiple patterning lithography process, comprising generating a graphical IC layout file comprising an SRAM memory circuit having a having a plurality of word lines configured to activate an SRAM cell and a plurality of Y-control lines configured to provide control signals to a column circuit configured to activate one or more bit lines. The method further comprises pre-coloring one or more of the plurality of word lines and Y-control lines to indicate that the pre-colored word lines and Y-control lines are to be formed on a same mask. The method further comprises operating a decomposition algorithm that assigns two or more different colors to uncolored word lines and Y-control lines, such that the plurality of word lines and Y-control lines assigned a same color are to be formed on a same mask of a multiple mask set used for the multiple patterning lithography process. By forming the pre-colored word lines and Y-control lines on the same mask processing variations between on-chip structures corresponding to the word lines and Y-control lines are reduced.

In another embodiment, the present disclosure relates to a computer system, comprising a computer system, comprising a memory element configured to store a graphical IC layout comprising an SRAM memory circuit having a plurality of word lines configured to activate an SRAM memory cell and a plurality of Y-control lines oriented in parallel to the plurality of word lines and configured to provide control signals to a column circuit configured to activate one or more bit lines. The system further comprises a decomposition element configured to operate a decomposition algorithm on the SRAM memory circuit within the graphical IC layout that assigns two or more colors to uncolored word lines and Y-control lines. The system further comprises a pre-coloring element configured to pre-color one or more of the plurality of word lines and Y-control lines to indicate that the plurality of word lines and Y-control lines are to be formed on a same mask of a multiple mask set used for the multiple patterning lithography process independent of the decomposition algorithm.

What is claimed is:

1. A method for pre-coloring IC layout data for a multiple patterning lithography process, comprising:
generating a graphical IC layout file using a computing device, wherein the graphical IC layout file comprises a plurality of IC shapes comprising a plurality of word lines and a plurality of Y-control lines within an SRAM memory circuit, wherein the plurality of Y-control lines are oriented in parallel with the plurality of word lines;
pre-coloring selective IC shapes using the computing device;
operating a decomposition algorithm using the computing device, wherein the decomposition algorithm assigns two or more different colors to uncolored IC shapes, such that IC shapes assigned a same color are to be formed on a same mask of a multiple mask set used for the multiple patterning lithography process;
wherein the pre-colored IC shapes are to be formed on a same mask independent of the two or more different colors assigned by the decomposition algorithm;
wherein forming the pre-colored IC shapes on the same mask reduces processing variations between on-chip structures corresponding to the pre-colored IC shapes; and
wherein pre-coloring one or more of the word lines and Y-control lines comprises placing a pre-coloring marker shape on the one or more of the plurality of word lines and Y-control lines, which indicates that the one or more of the plurality of word lines and Y-control lines are to be formed on the same mask.

2. The method of claim 1, further comprising:
restricting the placement of the pre-coloring marker shape by design rules that prevent placement of pre-coloring marker shape on lines having a spacing less than a design rule value.

3. The method of claim 1, wherein pre-coloring one or more of the word lines and Y-control lines comprises assigning a pre-coloring color, not used in the decomposition, to the one or more of the plurality of word lines and Y-control lines, such that a total number of colors assigned to the graphical IC layout file is greater than a number of masks in the multiple mask set.

4. The method of claim 1, wherein the plurality of Y-control lines are configured to convey one or more of: a sense amplifier enable signal, a Y-address decoding signal, a read or write enable signal, and a bit line pre-charge signal.

5. The method of claim 1, wherein pre-coloring the plurality of word lines and Y-control lines is performed after operating the decomposition algorithm.

6. The method of claim 1, wherein pre-coloring the plurality of word lines and Y-control lines is performed prior to operating the decomposition algorithm.

7. The method of claim 1, wherein the graphical IC layout file comprises a GDS file.

8. A method for pre-coloring IC layout data for a multiple patterning lithography process, comprising:
generating a graphical IC layout file using a computing device, wherein the graphical IC layout file comprises a plurality of IC shapes comprising a plurality of word lines and a plurality of Y-control lines within an SRAM memory circuit, wherein the plurality of Y-control lines are oriented in parallel with the plurality of word lines;
pre-coloring selective IC shapes using the computing device;
operating a decomposition algorithm using the computing device, wherein the decomposition algorithm assigns two or more different colors to uncolored IC shapes, such that IC shapes assigned a same color are to be formed on a same mask of a multiple mask set used for the multiple patterning lithography process;
wherein the pre-colored IC shapes are to be formed on a same mask independent of the two or more different colors assigned by the decomposition algorithm;
wherein forming the pre-colored IC shapes on the same mask reduces processing variations between on-chip structures corresponding to the pre-colored IC shapes; and
wherein pre-coloring the plurality of word lines and Y-control lines is performed prior to operating the decomposition algorithm.

9. The method of claim 8, wherein pre-coloring one or more of the word lines and Y-control lines comprises placing a pre-coloring marker shape on the one or more of the plurality of word lines and Y-control lines, which indicates that the one or more of the plurality of word lines and Y-control lines are to be formed on the same mask.

10. The method of claim 9, further comprising:
restricting the placement of the pre-coloring marker shape by design rules that prevent placement of pre-coloring marker shape on lines having a spacing less than a design rule value.

11. The method of claim 8, wherein pre-coloring one or more of the word lines and Y-control lines comprises assigning a pre-coloring color, not used in the decomposition, to the one or more of the plurality of word lines and Y-control lines, such that a total number of colors assigned to the graphical IC layout file is greater than a number of masks in the multiple mask set.

12. The method of claim 8, wherein the plurality of Y-control lines are configured to convey one or more of: a sense amplifier enable signal, a Y-address decoding signal, a read or write enable signal, and a bit line pre-charge signal.

13. The method of claim 8, wherein the graphical IC layout file comprises a GDS file.

14. A method for pre-coloring IC layout data for a multiple patterning lithography process, comprising:
generating a graphical IC layout file using a computing device, wherein the graphical IC layout file comprises a plurality of IC shapes comprising a plurality of word lines and a plurality of Y-control lines within an SRAM memory circuit, wherein the plurality of Y-control lines are oriented in parallel with the plurality of word lines;
pre-coloring selective IC shapes using the computing device;
operating a decomposition algorithm using the computing device, wherein the decomposition algorithm assigns two or more different colors to uncolored IC shapes, such that IC shapes assigned a same color are to be formed on a same mask of a multiple mask set used for the multiple patterning lithography process;
wherein the pre-colored IC shapes are to be formed on a same mask independent of the two or more different colors assigned by the decomposition algorithm;
wherein forming the pre-colored IC shapes on the same mask reduces processing variations between on-chip structures corresponding to the pre-colored IC shapes; and
wherein pre-coloring the plurality of word lines and Y-control lines is performed after operating the decomposition algorithm.

15. The method of claim 14, wherein pre-coloring one or more of the word lines and Y-control lines comprises placing a pre-coloring marker shape on the one or more of the plurality of word lines and Y-control lines, which indicates that the one or more of the plurality of word lines and Y-control lines are to be formed on the same mask.

16. The method of claim 15, further comprising:
restricting the placement of the pre-coloring marker shape by design rules that prevent placement of pre-coloring marker shape on lines having a spacing less than a design rule value.

17. The method of claim 14, wherein pre-coloring one or more of the word lines and Y-control lines comprises assigning a pre-coloring color, not used in the decomposition, to the one or more of the plurality of word lines and Y-control lines, such that a total number of colors assigned to the graphical IC layout file is greater than a number of masks in the multiple mask set.

18. The method of claim 14, wherein the plurality of Y-control lines are configured to convey one or more of: a sense amplifier enable signal, a Y-address decoding signal, a read or write enable signal, and a bit line pre-charge signal.

19. The method of claim 14, wherein the graphical IC layout file comprises a GDS file.

* * * * *